United States Patent
Chaudhry

(10) Patent No.: US 9,692,602 B2
(45) Date of Patent: Jun. 27, 2017

(54) METHOD AND APPARATUS FOR MUTUALLY AUTHENTICATING A USER DEVICE OF A PRIMARY SERVICE PROVIDER

(75) Inventor: Kapil Chaudhry, Cerritos, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1648 days.

(21) Appl. No.: 11/959,060

(22) Filed: Dec. 18, 2007

(65) Prior Publication Data

US 2009/0158414 A1    Jun. 18, 2009

(51) Int. Cl.
  *H04L 29/06* (2006.01)
  *H04L 9/32* (2006.01)

(52) U.S. Cl.
  CPC .......... *H04L 9/3263* (2013.01); *H04L 9/3273* (2013.01); *H04L 63/0823* (2013.01); *H04L 63/0869* (2013.01); *H04L 2209/60* (2013.01); *H04L 2209/80* (2013.01)

(58) Field of Classification Search
  CPC . H04L 63/0823; H04L 9/3273; H04L 9/3263; H04L 63/0869; H04L 2209/80; H04L 2209/60
  USPC ....................................................... 726/3, 10
  See application file for complete search history.

(56) References Cited

U.S. PATENT DOCUMENTS

| | | | |
|---|---|---|---|
| 7,421,731 B2* | 9/2008 | Mitchell et al. | 726/3 |
| 7,424,616 B1* | 9/2008 | Brandenburg | G06Q 30/06 705/67 |
| 7,685,206 B1* | 3/2010 | Mathew et al. | 707/785 |
| 7,783,884 B2* | 8/2010 | Nakano et al. | 713/175 |
| 2002/0120867 A1* | 8/2002 | Mitchell et al. | 713/201 |
| 2003/0014629 A1* | 1/2003 | Zuccherato | H04L 9/3268 713/156 |
| 2003/0105720 A1* | 6/2003 | Ishibashi | 705/52 |
| 2003/0217288 A1* | 11/2003 | Guo et al. | 713/201 |
| 2004/0117500 A1* | 6/2004 | Lindholm et al. | 709/231 |
| 2004/0122961 A1* | 6/2004 | Rouault | 709/229 |
| 2005/0076205 A1* | 4/2005 | Thornton et al. | 713/156 |
| 2005/0289641 A1* | 12/2005 | Miura et al. | 726/4 |
| 2006/0015358 A1* | 1/2006 | Chua | 705/1 |
| 2007/0038931 A1* | 2/2007 | Allaire et al. | 715/526 |
| 2008/0155254 A1* | 6/2008 | Stradling | 713/157 |
| 2009/0083163 A1* | 3/2009 | Diamond | 705/26 |
| 2009/0285394 A1* | 11/2009 | Diamond | 380/259 |
| 2011/0258447 A1* | 10/2011 | Wei et al. | 713/168 |

* cited by examiner

*Primary Examiner* — Harunur Rashid
(74) *Attorney, Agent, or Firm* — Harness, Dickey & Pierce, PLC

(57) ABSTRACT

A system and method for communicating between a secondary content provider and a user device includes a primary service provider having an authentication server of a primary service provider authenticating the user device. The primary service provider provides primary content to the user device. The system also includes a supplemental service provider. The authentication server authenticates the service provider. The user device and the supplemental service provider mutually authenticate each other. Thereafter, the supplemental service provider communicates supplemental content to the user device.

22 Claims, 3 Drawing Sheets

METHOD AND APPARATUS FOR MUTUALLY AUTHENTICATING A USER DEVICE OF A PRIMARY SERVICE PROVIDER

TECHNICAL FIELD

The present disclosure relates generally to communication systems having a primary service provider and a supplemental service provider, and more particularly, to a method and system for mutually authenticating a supplemental service provider and a user device of the primary service provider.

BACKGROUND

The statements in this section merely provide background information related to the present disclosure and may not constitute prior art.

Communication systems such as pay communication systems include a primary service provider and a user device. The user device is typically provided with authorization to communicate with the primary service provider and receive services therefrom. One example of such a system is a satellite television system such as DIRECTV®. Conditional access is provided at the user device in the form of a card to allow the user device to receive signals from the primary service provider.

Allowing other service providers to interact with and provide different services that supplement the primary service, may be desirable. Ensuring the user device communicates only with authorized supplemental service providers and vice versa is desirable to maintain the integrity of the system.

SUMMARY

The present disclosure allows the supplemental service provider and a user device of a primary service provider to mutually authenticate each other.

In one aspect of the invention, a method includes authenticating a user device with an authentication server of a primary service provider, authenticating a supplemental service provider with an authentication server of a primary service provider, mutually authenticating the user device with the supplemental service provider and after mutually authenticating, communicating directly between the supplemental service provider and the user device.

In a further aspect of the invention, a method includes communicating a root certificate request from a user device to an authentication server, communicating a root certificate from an authentication server to the user device, storing the root certificate in the user device, communicating a request to sign a supplemental service provider certificate from a supplemental service provider to the authentication receiver, signing the supplemental service provider certificate at the authentication server to form a signed supplemental service provider certificate, communicating a request for authentication and the supplemental service provider certificate between the supplemental service provider and the user device; and communicating the root certificate from the user device to the supplemental service provider.

In yet another aspect of the invention, a system includes a user device and an authentication server of a primary service provider authenticating the user device. The primary service provider provides primary content to the user device. The system also includes a supplemental service provider. The authentication server authenticates the service provider. The user device and the supplemental service provider mutually authenticate each other. Thereafter, the supplemental service provider communicates supplemental content to the user device.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
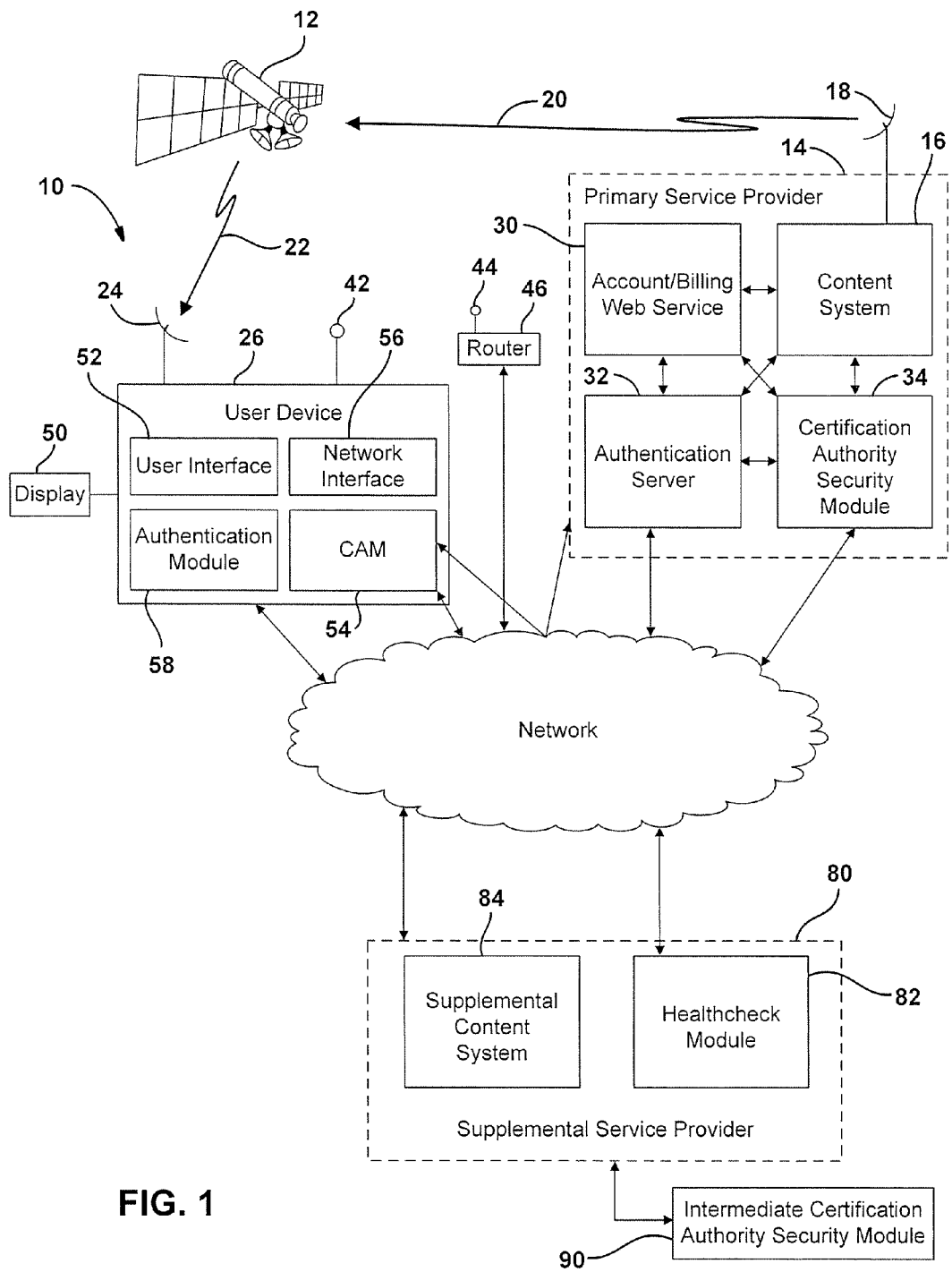
FIG. 1 is a block diagrammatic view of a communication system including a primary service provider, a supplemental service provider and a user device.

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

Further, while the following disclosure is made with respect to the delivery of content (e.g., television (TV), movies, games, music videos, etc.), it should be understood that the systems and methods disclosed herein could also be used for delivery of any media content type, for example, audio, music, data files, web pages, games, etc. Additionally, throughout this disclosure reference is made to data, information, programs, movies, assets, video data, etc., however, it will be readily apparent to persons of ordinary skill in the art that these terms are substantially equivalent in reference to the example systems and/or methods disclosed herein. As used herein, the term title or program will be used to refer to, for example, a media content type such as a movie itself and not the name of the movie.

Referring now to FIG. 1, a satellite television broadcast system 10 is illustrated. The satellite television broadcast system 10 is illustrated by way of example. However, the present invention is not limited hereto as mentioned above. The television broadcast system 10 includes a satellite 12 that receives content or programming from a primary service provider 14. More specifically, the primary service provider 14 includes a content system 16 that generates uplink signals 20 through an uplink antenna 18. The uplink signals 20 may be television signals and more specifically digital television signals. The uplink antenna 18 communicates the uplink signals 20 to the satellite 12 which in turn generates downlink signals 22. The downlink signals 22 are communicated to a receiving antenna 24 on a user device 26. Although only one user device 26 is illustrated, several user devices may be provided in a broadcasting system 10. The uplink signals 20 and downlink signals 22 may be referred to as communication signals. Communication signals are wireless communication signals and may include various types of entertainment content, traffic, weather, hazardous material warnings, advertising material, and the like. As mentioned above, this system may be suitable for wired systems such as cable televisions and terrestrial wireless systems.

The user device 26 may include a satellite television receiver or set top box. The satellite television receiver may also be referred to as an integrated receiver decoder. Of course, other types of user devices may be used such as a cable television set top box. Other types of user devices may include a mobile device such as a lap top computer, cellular phone, personal digital assistant, a portable media player or an automotive-based television receiving device. Thus, the user device may be a fixed user device in the case of a satellite television set top box or a mobile user device. Both fixed and mobile devices may be used in a system.

The primary service provider 14 may also include an account/billing web service 30, an authentication server 32, and a certification authority service module 34.

The user device 26 is in communication with the primary service provider 14 through a network 40. The network 40 may be a secured network or uses a secure protocol. The network 40 may include a broadband network through which the user device 26 communicates with the primary service provider 14. The network 40 may be a wired network such as a public-switched telephone network (PSTN) or a broadband network. The broadband network may communicate wired, wirelessly or a combination of both. For example, the user device 26 may include a wireless antenna 42 for communicating with an antenna 44 of a router 46 which, in turn, is in communication with the network 40.

The user device 26 may be associated with a display 50 for displaying content and programming, as well as displaying various types of user commands, or the like. The display 50 may be a television or an integrated display. The display 50 may include speakers for an audio display. The display 50 may be used for displaying primary content from a primary service provider and secondary content from a secondary service provider.

The user device 26 may include an interface 52, such as a keyboard, remote control, or the like, for selecting and entering various types of information by the user. The user device may also include a conditional access module 54 that allows the user to access the programming provided from the content system 16. The conditional access module 54 may be referred to as an access card. The conditional access module 54 may include various activation codes without which the user device is not activated. The conditional access module 54 may include a conditional access module identifier such as a number or a code.

The user device 26 may also include a network interface 56 for interfacing with the network 40. For example, the network interface 56 may communicate wirelessly through the antenna 52 or through a direct connection such as an Ethernet connection. The network interface 56 may be a wireless broadband interface, a broadband interface, a modem-type interface or a public-switched telephone network interface.

The user device may include an authentication module 58 for performing the authentication process described below in FIGS. 2 and 3. The authentication module 58 may control the communication and the storage of a certificate such as a root certificate from the primary service provider 14.

The authentication server 32 of the primary service provider 14 may be used to authenticate the various user devices 26 within the system 10. Each user device 26 may send a receiver ID that may correspond to a serial number of the user device 26. The receiver ID may be stored in a memory and may be referred generally to as a user device identifier. The receiver device ID and a conditional access module or card ID may be communicated to the authentication server 32 through the network 40. The authentication server 32 may communicate with the account/billing web service 30 to determine if the proper receiver ID and card ID are associated together. The authentication server 32 may communicate with the certification authority security module 34 to retrieve a root certificate, a user device certificate and a private key for encryption.

The user device 26 may be in communication with a supplemental service provider 80 through the network 40. The supplemental service provider 80 may include an authentication module 82 and a supplemental content system 84. The authentication module 82 may be used for authenticating between the user device 26 and the supplemental service provider 80 and the supplemental service provider 80.

The supplemental content system 84 may provide various types of content to supplement the content provided by the primary service provider. The supplemental content may, for example, be various types of content including financial information, weather information, voicemail information, or other types of information. The supplemental content system 84 may provide the content to be displayed on a special channel within the user device 26 or overlayed with the content provided from the primary service provider 14.

An intermediate certification authority security module 90 may be used to sign a certificate from the supplemental content system 84 prior to sending the certificate to the authentication module 32. Various third parties may act as an intermediate certification authority.

Figure 2:
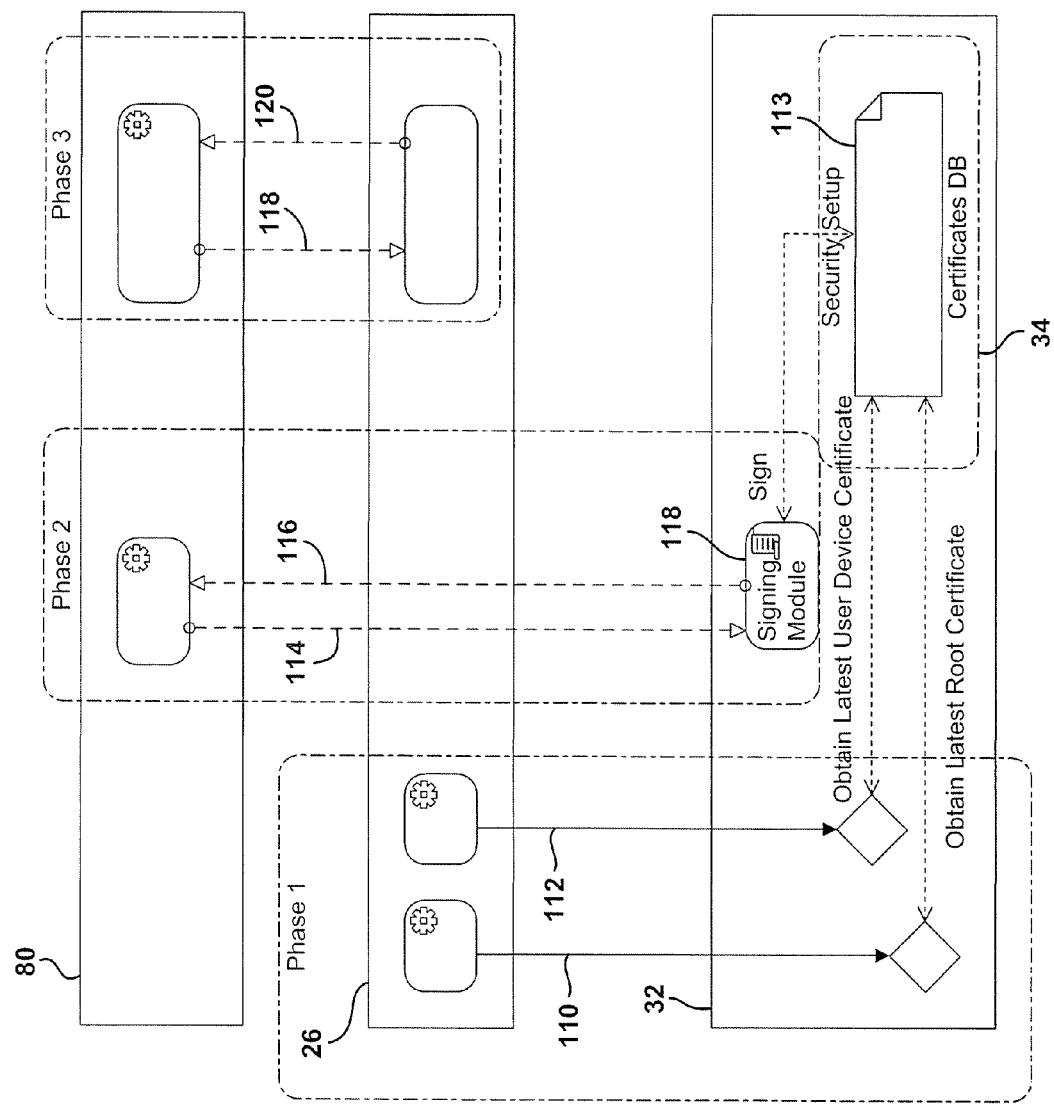
FIG. 2 is a flowchart of a method for mutually authenticating a user device and a supplemental service provider.

Referring now to FIG. 2, a method for providing mutual authentication between a user device 26, the authentication server 32 and the supplemental service provider 80. The authentication process is set forth in three phases. Phase I, in which the user device and the authentication server communicate. Phase II provides authentication between the supplemental service provider 80 and the authentication server 32. Phase III provides authentication between the external vendor and the user device.

In step 110, the user device retrieves the latest primary service provider root certificate by contacting the authentication server 32 with an authentication request. The authentication server 32 responds in step 112 with the root certificate obtained from the certification authority security module 34.

In Phase II, interaction between the supplemental service provider 80 and the primary service provider 14 is performed. In Phase II, the authentication server 32 allows the existing certificates of the supplemental service provider 80 to be signed by the certification authority security module 34.

In step 114, the supplemental service provider 80 communicates a supplemental service provider certificate that may be already signed by an intermediate certification authority security module 90. The certification authority security module 34 of the primary service provider 14 is used to or communicates to a signing module 118 that signs the certificate from the supplemental service provider 80 and communicates the primary-signed supplemental service provider certificate and communicates it back to the supplemental service provider 80. The certificate may be twice signed. Once by the intermediate module 90 and once by the primary service provider 14. A copy of the primary signed supplemental service provider certificate may be stored in a certificate database 113 within the certification authority security module 34.

In Phase III, mutual authentication of the supplemental service provider 80 and the user device 26 may be performed. The mutual authentication involves the root certificate of Phase I and the primary signed supplemental service provider certificate of Phase II.

Figure 3:
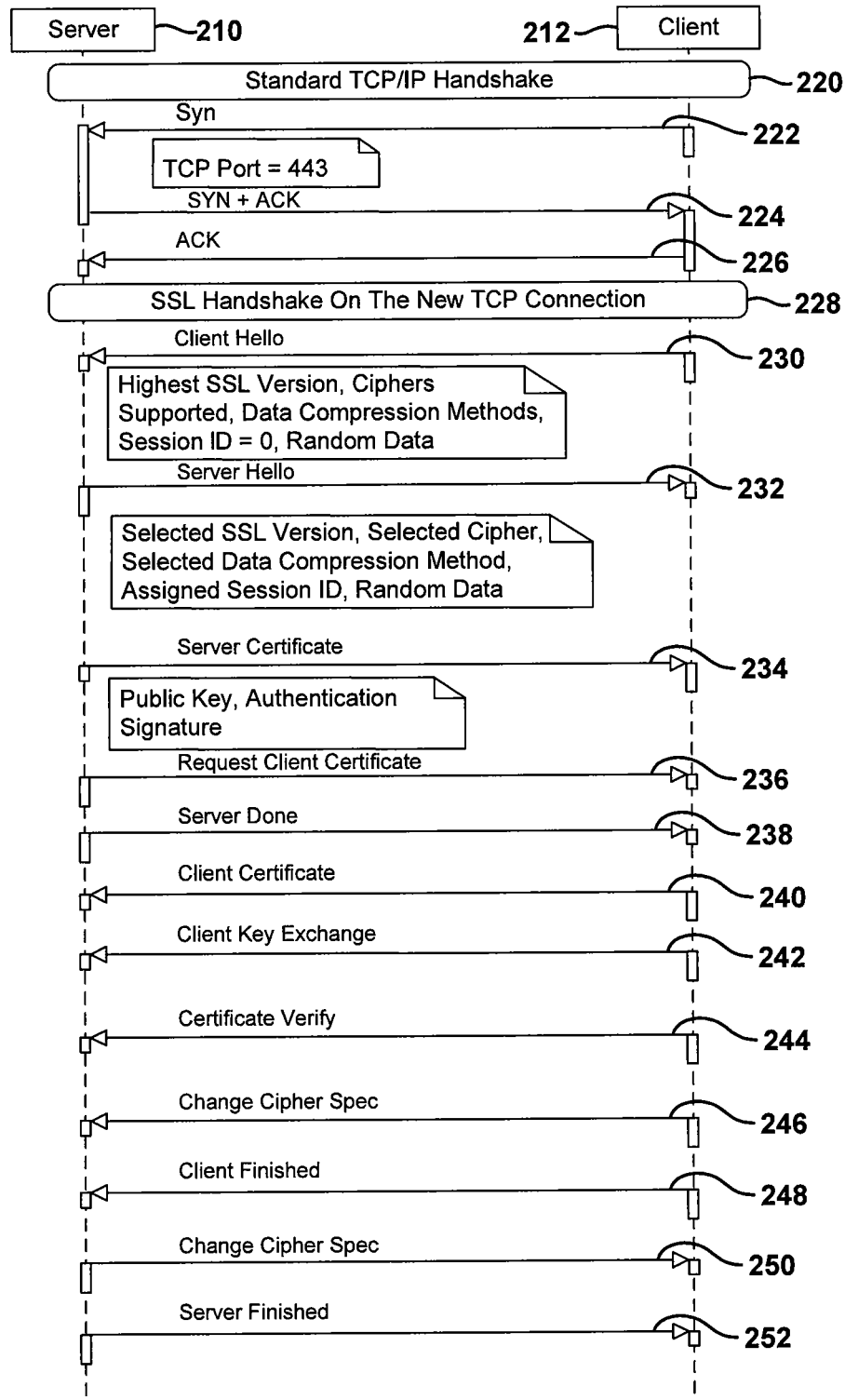
FIG. 3 is a detailed flowchart of phase 3 of FIG. 2.

Referring now to FIG. 3, a method for secure socket layer (SSL) handshaking for mutual authentication of a user device 26 and a supplemental service provider 80 is illustrated. The drawing includes a server 210 and a client 212. Both the user device 26 and the supplemental service provider 80 may act as either the client 212 or the server 210 depending on the context. The first portion of the process is a standard TCP/IP handshake in step 220. To initiate a secure session, the server 210 establishes a TCP/IP connection or attempts to establish the connection on a hypertext transfer protocol secure TCP port 443. Once this is established in step 220, the client generates an SYN signal. In step 224, in response, the server generates a SYN plus ACK signal. The SYN signal is a synchronized sequence number and the ACK signal is an acknowledgment signal.

After the SYN and ACK signal are provided from the server to the client, an acknowledge (ACK) signal is provided from the client 212 to the server 210 in step 226. In box 228, an SSL handshake provided on the TCPIP connection is generated. In step 230, the client 212 generates a CLIENT HELLO command to the server 210. The CLIENT HELLO command may include: the highest SSL and TLS version supported by the client; ciphers supported by the client; ciphers listed in order of preference; data-compressing methods supported by the client; if the client is starting a new SSL session, the session ID is zero; and random data that is generated by the client for use in the key generation process.

In step 232, the server 210 sends a SERVER HELLO command to the client 212. The SERVER HELLO command includes: the SSL or TLS version that will be used for the SSL session; the cipher that will be used for the SSL session; the data compression method that will be used for the SSL session; the session ID for the SSL session; and random data that is generated by the server for use in a key generation process. In step 234, the server sends a CERTIFICATE command. This command includes the server certificate and optionally a chain of certificates beginning with the certificate of the authority (CA) 34 that is assigned the server certificate. In step 236, the server sends a request for a client certificate after sending its own certificate. This may be performed from the user device 26. In step 238, the server sends a SERVER DONE command. The SERVER DONE command indicates that the server was completed with this phase of the SSL handshake. If the client authorization will be performed, additional commands flow between a client and the server un-command.

In step 240, the client 212 sends the certificate to the server 210. This may happen between the supplemental service provider 80 and the user device 26.

In step 242, the client 212 generates a symmetric key and encrypts it using the certificate or public key of the user device. It then sends this message to the user device. In step 244, the client 212 sends a certificate verify message in which it encrypts a known piece of plain text using its private key. The user device uses the client certificate to decrypt; therefore, ascertaining the client has the private key.

In step 246, the client 212 sends the CHANGE CIPHER SPEC command. This command indicates that the contents of the subsequent SSL record data sent by the client during the SSL session will be encrypted. The header may be a five-byte SSL record header which may not be encrypted.

In step 248, the client sends a FINISHED command. The FINISHED command includes a digest of all the SSL handshake commands that have flowed between the client and the server up to this point. The command is sent to validate that none of the commands sent previously, which flow between the client and the server, were altered in flight.

In step 250, the server sends the CHANGE CIPHER SPEC command. The CHANGE CIPHER SPEC command indicates that all subsequent data by the server during the SSL session will be encrypted.

In step 252, the server 210 sends a FINISHED command. The FINISHED command includes a digest of all the SSL handshake commands that have flowed between the server and the client up to this point.

After authentication, the supplemental service provider may communicate various types of supplemental control to the user device. Also, the user device is able to communicate commands, data or other information to the supplemental service provider.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
authenticating a user device with an authentication server of a primary service provider and forming a root certificate at the primary service provider;
communicating the root certificate to the user device from the primary service provider;
authenticating a supplemental service provider by signing a supplemental service provider certificate at an intermediate authentication authority to form a signed supplemental service provider certificate then signing the signed supplemental service provider certificate with the authentication server of the primary service provider and forming a twice-signed supplemental service provider certificate, said supplemental service provider separate from the primary service provider;

communicating the twice-signed supplemental service provider certificate to the supplemental service provider;

mutually authenticating the user device and the supplemental service provider with each other using the root certificate and the twice-signed supplemental service provider certificate; and after mutually authenticating, communicating directly between the supplemental service provider and the user device.

2. The method as recited in claim 1 further comprising communicating primary content from the primary service provider to the user device.

3. The method as recited in claim 2 wherein communicating directly between the supplemental service provider and the user device comprises communicating supplemental content from the supplemental service provider and the user device.

4. The method as recited in claim 1 wherein authenticating the user device with the authentication server comprises authenticating a satellite television receiving unit with the authentication server.

5. The method as recited in claim 1 wherein authenticating the user device with the authentication server comprises authenticating a mobile user device with the authentication server.

6. The method as recited in claim 1 wherein authenticating the user device with the authentication server comprises authenticating a mobile satellite television receiving device with the authentication server.

7. The method as recited in claim 1 wherein mutually authenticating the user device with the supplemental service provider comprises mutually authenticating the user device with the supplemental service provider using a transmission control protocol.

8. The method as recited in claim 1 wherein mutually authenticating the user device with the supplemental service provider comprises mutually authenticating the user device with the supplemental service provider using secure sockets layer protocol on a transmission control protocol.

9. A method comprising:
communicating a root certificate request from a user device to an authentication server;
communicating a root certificate from the authentication server to the user device;
storing the root certificate in the user device;
communicating a supplemental service provider certificate to an intermediate authentication authority to sign to form a signed supplemental service provider certificate and thereafter communicating a request to sign the signed supplemental service provider certificate from a supplemental service provider to a signing module of a primary service provider;
signing the signed supplemental service provider certificate at the signing module to form a twice-signed supplemental service provider certificate;
communicating the twice-signed supplemental service provider certificate to the supplemental service provider;
storing a copy of the twice-signed supplemental service provider certificate at the primary service provider;
communicating a request for authentication and the supplemental service provider certificate from the supplemental service provider to the user device;
communicating the root certificate from the user device to the supplemental service provider;
encrypting a symmetric key at the supplemental service provider with the root certificate or a public key of the user device to form an encrypted symmetric key;
communicating the encrypted symmetric key to the user device;
communicating an encrypted test message from the supplemental service provider to the user device;
communicating a validation signal from the user device to the supplemental service provider.

10. The method as recited in claim 9 wherein communicating the request for authentication and communicating the root certificate comprises communicating using a transmission control protocol.

11. The method as recited in claim 9 wherein communicating the request for authentication and communicating the root certificate comprises communicating using secure sockets layer protocol as a transmission control protocol.

12. The method as recited in claim 9 wherein communicating the root certificate request from the user device comprises communicating the root certificate request from a satellite television receiver.

13. The method as recited in claim 9 wherein communicating the root certificate request from the user device to an authentication server comprises communicating the root certificate request from the user device to the authentication server at the primary service provider.

14. The method as recited in claim 9 wherein communicating the root certificate comprises communicating the root certificate from a root certificate database.

15. The method as recited in claim 9 wherein communicating the root certificate comprises obtaining the root certificate from a root certificate database at the primary service provider.

16. A system comprising:
a user device;
a primary service provider having an authentication server authenticating the user device and forming a root certificate, said primary service provider providing primary content to the user device, said primary service provider communicating the root certificate to the user device;
a supplemental service provider separate from the primary service provider;
an intermediate authentication authority signing a supplemental service provider certificate to form a signed supplemental service provider certificate;
said authentication server authenticating the supplemental service provider by signing the signed supplemental service provider certificate to form a twice-signed supplemental service provider certificate and communicating the twice-signed supplemental service provider certificate to the supplemental service provider;
said user device and said supplemental service provider mutually authenticating each other using the root certificate and the twice-signed supplemental service provider certificate; and
said supplemental service provider communicating supplemental content to the user device through a network.

17. The system as recited in claim 16 wherein the supplemental service provider directly communicates supplemental content to the user device.

18. A system as recited in claim 16 wherein the network comprises a telephone network.

19. A system as recited in claim 16 wherein the network comprises a broadband network.

20. A system as recited in claim 16 further comprising a satellite communicating primary content to the user device from the primary service provider.

21. A system as recited in claim 16 wherein the user device comprises a satellite television set top box.

22. A system as recited in claim 16 wherein the user device comprises a mobile user device.

\* \* \* \* \*